United States Patent
Oduro et al.

(10) Patent No.: US 12,227,693 B2
(45) Date of Patent: Feb. 18, 2025

(54) AQUEOUS FLUID COMPOSITIONS AND BARITE SCALE REMOVAL THEREWITH

(71) Applicant: SAUDI ARABIAN OIL COMPANY, Dhahran (SA)

(72) Inventors: Harry Daniel Oduro, Dhahran (SA); Saleh Abdulrahman Haidary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/930,843

(22) Filed: Sep. 9, 2022

(65) Prior Publication Data

US 2024/0093082 A1    Mar. 21, 2024

(51) Int. Cl.
    C09K 8/54       (2006.01)
    C09K 8/528      (2006.01)
    E21B 37/06      (2006.01)

(52) U.S. Cl.
    CPC .......... *C09K 8/528* (2013.01); *C09K 8/54* (2013.01); *E21B 37/06* (2013.01); *C09K 2208/20* (2013.01)

(58) Field of Classification Search
    CPC ...... C09K 8/528; C09K 8/54; C09K 2208/20; E21B 37/06
    See application file for complete search history.

(56) References Cited

U.S. PATENT DOCUMENTS

| | | | |
|---|---|---|---|
| 2,564,238 A * | 8/1951 | Sprung | G03C 7/28 430/390 |
| 3,161,598 A * | 12/1964 | Geld | C23G 1/04 252/387 |
| 3,721,823 A * | 3/1973 | Van Lishout | G03C 7/28 430/365 |
| 4,030,548 A | 6/1977 | Richardson et al. | |
| 4,144,185 A | 3/1979 | Block | |
| 4,190,462 A | 2/1980 | De Jong et al. | |
| 4,288,333 A | 9/1981 | Van Zon et al. | |
| 4,708,805 A | 11/1987 | D'Muhala | |
| 5,068,042 A | 11/1991 | Hen | |
| 5,084,105 A | 1/1992 | Morris et al. | |
| 5,415,696 A | 5/1995 | Paul | |
| 6,653,260 B2 | 11/2003 | Brezinski | |
| 7,163,060 B2 | 1/2007 | Weiss et al. | |
| 7,470,330 B2 | 12/2008 | Keatch | |
| 8,119,575 B2 | 2/2012 | Taylor et al. | |
| 9,080,136 B2 | 6/2015 | Mortimer et al. | |
| 10,118,824 B2 | 11/2018 | Chiche et al. | |
| 10,323,177 B2 | 6/2019 | Wu et al. | |
| 11,130,898 B2 | 9/2021 | Zhou et al. | |
| 2015/0025270 A1 | 1/2015 | Shimizu et al. | |
| 2015/0344770 A1 | 12/2015 | Lewis | |
| 2019/0194528 A1 | 6/2019 | Purdy | |

FOREIGN PATENT DOCUMENTS

| | | |
|---|---|---|
| CA | 2977923 A1 | 3/2019 |
| CN | 100351172 C | 11/2007 |
| CN | 104043338 B | 9/2014 |
| CN | 104 085 857 A | 10/2014 |
| CN | 105130022 A | 12/2015 |
| CN | 114426523 A | 5/2022 |
| CN | 114 805 262 A | 7/2022 |
| JP | 4473351 B2 | 6/2010 |
| JP | 6931215 B2 | 9/2021 |
| KR | 2015 0077028 A | 7/2015 |

OTHER PUBLICATIONS

Product Data Sheet, downloaded on Apr. 10, 2024.*
Sazali et al., (2020): Study of Barium Sulfate Scale Dissolution into Ethylenediaminetetraacetic acid (EDTA). OP Conf. Series: Materials Science and Engineering 778 (2020) 012112.
Nasr-El-Din, H. A., Al-Mutairi, S. H., Al-Hajji, H. H., & Lynn, J. D. (2004): Evaluation of a New Barite Dissolver: Lab Studies., Proceedings of SPE International Symposium Exhibition on Formation Damage Control, Lafayette, Louisiana, USA, Feb. 18-20. doi: 10.2523/86501-ms.
Bageri, B.S., Mahmoud, M.A., Shawabkeh, R.A, Abdulraheem, A. (2017): Evaluation of Barium Sulfate (Barite) Solubility Using Different Chelating Agents at a High Temperature., Journal of Petroleum Science and Technology, 7 (1), pp. 42-45. doi: 10.22078/jpst.2017.707.
Abib, G.A.P., Da Cruz, G.F., and Vaz Junior, A.S.L. (2018): Study of barium sulfate dissolution by scale dissolver based on solutions of DTPA. Anais da Academia Brasileira de Ciências, 90(3), pp. 3185-3196. doi: 10.1590/0001-3765201820170728.
BinMerdhah, A., Azam, A. & Yassin, M. (2008): Study of scale formation due to incompatible water. Jurnal Teknologi, 49, pp. 9-26.
Dunn, K., Daniel, E., and Shuler, P.J. 1 (1999). Mechanisms of Surface Precipitation and Dissolution of Barite: A Morphology Approach. Journal of Colloid and Interface Science 214 (2) 427-437. doi: 10.1006/jcis. 1999.622.
Wang, K.-S., Resch, R., Dunn, K., et al. (1999): Dissolution of the Barite (001) Surface by the Chelating Agent DTPA as Studied with Non-Contact Atomic Force Microscopy. Colloids and Surfaces: Physicochemical and Engineering Aspects 160 (3): 217-227. doi: 10.1016/S0927-7757(99)00183-1.

(Continued)

*Primary Examiner* — Kumar R Bhushan
(74) *Attorney, Agent, or Firm* — Vorys, Sater, Seymour and Pease, LLP (57) ABSTRACT

Barite (barium sulfate) scale may be problematic in subterranean formations, wellbores, pipelines, and other locations and may be difficult to remove in many instances. Aqueous fluid compositions effective for removing barite scale may comprise a concentrated mineral acid, a first salt comprising an iodide anion, and a second salt comprising an anion that forms an aqueous-soluble barium salt. One suitable aqueous fluid composition may comprise concentrated hydroiodic acid, an alkali metal iodide, and an alkali metal hypophosphite salt. The aqueous fluid compositions may be used in combination with a second treatment phase comprising a fluid composition comprising at least one acid gas capturing agent. The at least one acid gas capturing agent may comprise a first component reactive toward hydrogen sulfide and an optional second component reactive toward carbon dioxide.

23 Claims, 5 Drawing Sheets

(56) References Cited

OTHER PUBLICATIONS

Geng, et al., Rapid Commun. Mass Spectrom, 2018, pp. 333-341, 32.
Paul and Fieler, 1992—"A New Solvent for Oilfield Scales", SPE 24847.
Kamal et al., 2018—"Oilfield scale formation and chemical removal: A review"; Journal of Petroleum Science and Engineering, 171, pp. 127-139.
ISR/WO for PCT/US2023-031999 (that claims priority to the present application) dated Dec. 13, 2023.

* cited by examiner

AQUEOUS FLUID COMPOSITIONS AND BARITE SCALE REMOVAL THEREWITH

FIELD OF THE DISCLOSURE

The present disclosure relates generally to scale dissolution and, more particularly, aqueous fluid compositions effective for at least partially dissolving barite scale in a specified location, such as in subterranean formations and pipelines.

BACKGROUND OF THE DISCLOSURE

Barium sulfate ($BaSO_4$), also commonly referred to as the mineral form barite, is a commonly used weighting agent to produce high-density drilling fluids for maintaining hydrostatic pressure when drilling a wellbore in a subterranean formation. Although effective for the foregoing purpose, once barite has been introduced to a wellbore, the presence of the barite may become problematic. Residual barite may be difficult to remove from a wellbore due to its relatively low solubility (approximately 2.5 mg/L at 25° C.) in aqueous fluids, including aqueous acids frequently employed downhole. Moreover, when dissolving barite to affect its removal, it is also very easy to exceed the solubility limit, which may re-precipitate the barite as barite scale. Re-precipitated barite scale may be even more problematic to remove by virtue of its increased hardness and crystallinity compared to native or synthetic barite, typically as a consequence of the barite scale incorporating formation water impurities (e.g., monovalent and divalent cations, minerals, and other dissolved solids). Formation of barite scale may lead to a number of serious consequences including for example, formation damage, increased and potentially unplanned workovers of downhole equipment and formation zones, plant or pipeline shutdown, production loss, high costs to replace non-repairable equipment, and the like.

Barite scale may be removed from a location where it occurs through chemical, mechanical, and/or physical treatment methods. Mechanical and physical treatment methods involve debriding the barite scale from a surface and may be expensive, time-consuming, and operationally complex. Jetting of an aqueous fluid may also be used to assist in removing the barite scale in some instances. Chemical methods for removing barite scale may utilize acids or chelating agents to promote dissolution of the barite scale. Excessive use of acids may be undesirable due to their expense, problematic waste disposal concerns (especially for incompletely spent acid solutions), and the potential for corrosion of metallic surfaces downhole, in the near-wellbore area, and in pipelines. Moreover, since the chemical form of the barite remains unchanged upon undergoing dissolution in an acid, re-precipitation of barite scale remains a significant risk even if the dissolution conditions are carefully controlled. Chelating agents may alleviate this difficulty to some degree, but chelating agents may be expensive, and effective chelation of barium ions may not occur readily under all conditions under which barite scale formation takes place. For example, the local pH environment in proximity to a barite scale or within a fluid promoting dissolution of a barite scale may be ineffective for barium ion chelation to take place in some instances.

In some instances, it may not be feasible to avoid conditions under which barite scale formation takes place. For example, it may not be possible to avoid exposure of dissolved barite to incompatible formation waters and/or it may not be feasible to add a sufficient quantity of aqueous fluid to maintain the barite concentration below the solubility limit. In view of the foregoing, further strategies for removing barite and barite scale in various locations would be highly desirable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to various embodiments consistent with the present disclosure, aqueous fluid compositions may comprise: a concentrated mineral acid; a first salt comprising an iodide anion; and a second salt comprising an anion that forms an aqueous-soluble barium salt.

In other embodiments consistent with the present disclosure, scale dissolution systems may comprise: a first treatment phase comprising an aqueous fluid composition, the aqueous fluid composition comprising: a concentrated mineral acid; a first salt comprising an iodide anion; and a second salt comprising an anion that forms an aqueous-soluble barium salt; and a second treatment phase comprising a fluid composition comprising at least one acid gas capturing agent.

In still other embodiments consistent with the present disclosure, scale dissolution methods may comprise: introducing an aqueous fluid composition to a location containing barite scale, the aqueous fluid composition comprising: a concentrated mineral acid; a first salt comprising an iodide anion; and a second salt comprising an anion that forms an aqueous-soluble barium salt; and contacting the barite scale with the aqueous fluid composition for a sufficient time to dissolve at least a portion of the barite scale.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure relates generally to scale dissolution and, more particularly, aqueous fluid compositions effective for at least partially dissolving barite scale in a specified location, such as in subterranean formations and pipelines.

As discussed above, barite scale may lead to a number of serious consequences in oil and gas production, including potentially shutting down a job site or necessitating expensive and time-consuming workover operations. Removal of barite scale may be exceptionally problematic, regardless of whether conducted through mechanical, physical, or chemical methods. Chemical methods for dissolving barite scale may be effective in some instances, but they can present a significant risk of re-precipitating barite scale upon exceeding the solubility limit and/or upon contacting incompatible formation waters. The re-precipitated barite scale may form unexpectedly and in a location where it can be even more difficult to remove. Thus, barite scale removal remains an ongoing issue in oil and gas production.

In response to the foregoing need, the present disclosure provides aqueous fluid compositions that may be effective for dissolving barite or barite scale in various working environments, such as within a subterranean formation, a wellbore penetrating a subterranean formation, a plant, or a pipeline. In particular, the aqueous fluid compositions disclosed herein may comprise a concentrated mineral acid, a first salt comprising an iodide anion (an iodide salt), and a second salt comprising an anion that forms an aqueous-soluble barium salt. In more specific examples, the concentrated mineral acid may comprise concentrated hydroiodic acid, and the second salt may also be a reducing agent. Hypophosphite salts, such as sodium hypophosphite monohydrate ($NaH_2PO_2 \cdot H_2O$), may be particularly desirable second salts that are both a reducing agent and capable of providing an anion for forming an aqueous-soluble barium salt. Without being bound by theory or mechanism, sodium hypophosphite monohydrate is believed to relax the topmost unit cell layer of barite crystals, thereby leading to a disruption in bond distance between barium ions and oxygen atoms in the sulfate anions and facilitating dissolution as described further hereinafter.

Use of hydroiodic acid in combination with an iodide salt and sodium hypophosphite monohydrate may afford a number of advantages for dissolving barite. At the very least, these reagents may interact with one another in a complementary fashion to promote barite dissolution. Without being bound by theory or mechanism, dissolution of barite with the foregoing reagents is believed to take place by Reactions 1-3. The net reaction is shown in Reaction 4.

(Reaction 1)

(Reaction 2)

(Reaction 3)

(Reaction 4)

Bearing the foregoing reactions in mind, dissolution of barite is driven by two complementary factors: 1) exchange of a sulfate anion ($SO_4^{2-}$) for hypophosphite ($H_2PO_2^{-}$) to form a soluble barium salt, and 2) conversion of the resulting free sulfate anion into hydrogen sulfide ($H_2S$). Conversion of the sulfate into hydrogen sulfide may significantly decrease the risk of reverting an aqueous-soluble barium salt into insoluble barite scale. Moreover, the amount of sodium hypophosphite monohydrate in the aqueous fluid compositions may at least partially determine the amount of barium hypophosphite that is formed and potentially solubilized (if the solubility limit of this salt is not exceeded). Thus, depending on the amount of barite in need of dissolution, the amount of sodium hypophosphite monohydrate in the aqueous fluid compositions may be adjusted as needed to promote a desired degree of dissolution. That is, the sodium hypophosphite monohydrate may function as the limiting reagent in a barite scale dissolution process. The NaI and $I_2$ formed in the above reactions potentially may further form triiodide ($I_3^{-}$) as a subsequent reaction product if the sodium hypophosphite monohydrate salt is the limiting reagent (or if a secondary reducing agent is not present). If excess sodium hypophosphite monohydrate remains (or if a secondary reducing agent is present), however, any triiodide that does form may be subsequently reduced to iodide ions, which may continue to promote sulfate reduction in accordance with the foregoing reactions. It is to be further appreciated that phase equilibria of the various iodine-containing species between liquid and gas phases may additionally influence any subsequent reactions that occur following dissolution of barite scale (phase equilibria not shown in Reactions 1-4 in the interest of clarity). Moreover, at reservoir temperatures above about 72° C., any putatively formed triiodide ions may undergo conversion to hypoiodous acid (HIO), which is unstable and may undergo subsequent disproportionation into iodate ($IO_3^{-}$) ions and iodide ions that may further promote barite scale dissolution.

In addition to the foregoing features, hydroiodic acid is an advantageous mineral acid for use in conjunction with dissolving barite, since hydroiodic acid may provide a high concentration of iodide ions for promoting reduction of sulfate anions. The iodide ions provided by the hydroiodic acid may be further supplemented with those provided by the iodide salt. Thus, hydroiodic acid may lessen the amount of iodide salt needed to supply a sufficient amount of iodide anions for reducing sulfate anions.

Hydroiodic acid may be advantageous in other respects compared to other mineral acids as well. Although other mineral acids, such as concentrated hydrochloric acid or concentrated hydrobromic acid, may also be effective for promoting conversion of sulfate anions into hydrogen sulfide (if sufficient iodide anions are present and provided by the iodide salt), as shown in Reactions 2 and 3, other concentrated mineral acids have a much lower hydrogen halide concentration compared to hydroiodic acid and therefore contain more water relative to the amount of dissolved hydrogen halide that is present. For example, concentrated hydrochloric acid and concentrated hydrobromic acid have concentrations of approximately 36% and 48% w/v, respectively, whereas commercial concentrated hydroiodic acid solutions may be up to about 67% w/v. Limiting the amount of water that is present when dissolving barite according to the disclosure herein may lessen the occurrence of side reactions that may reform sulfate anions from hydrogen sulfide, which may lead to re-precipitation of barite scale if not carefully controlled.

In addition to promoting formation of an aqueous-soluble barium salt, sodium hypophosphite monohydrate may provide further advantages when used in combination with hydroiodic acid, specifically with regard to the reducing properties of this salt. Hydroiodic acid may undergo partial degradation into elemental iodine and the unstable acid hydrotriiodic acid. The elemental iodine may form triiodide anions upon reacting with the iodide anions provided by the iodide salt, thereby decreasing the total amount of iodide ions available for performing sulfate reduction. The sodium hypophosphite monohydrate may reduce the triiodide anions or other oxidized iodine species back to iodide anions for promoting reductive dissolution of sulfate according to the disclosure herein.

Even in conventional barite dissolution processes, acid gases (e.g., carbon dioxide and hydrogen sulfide) may commonly form or be encountered downhole in the course of removing barite scale. The reaction chemistry described herein further produces an equimolar amount of hydrogen sulfide per unit quantity of barite that undergoes a reaction to form an aqueous-soluble barium salt. Advantageously, acid gases generated in the course of dissolving barite according to the disclosure herein (or otherwise present downhole) may be readily remediated through a second phase treatment with a fluid comprising acid gas capturing agent. The second phase treatment may be administered after barite dissolution is complete or partially complete, or the second phase treatment may be added to the aqueous fluid composition promoting barite dissolution. In either case, release of acid gases may be eliminated or significantly decreased. The second phase treatment containing the acid gas capturing agent is not believed to significantly impact the reaction chemistry promoting barite dissolution in accordance with the disclosure above. As a further advantage, by capturing hydrogen sulfide with the acid gas capturing agent, the likelihood of the hydrogen sulfide reforming sulfate anions through a side reaction with water, thereby increasing the risk of re-precipitating barite scale, may be significantly lessened.

Because hydrogen sulfide is obtained as a consequence of the reaction chemistry discussed above, the second phase treatments disclosed herein may comprise at least one acid gas capturing agent that is reactive toward hydrogen sulfide. Depending on whether a carbonate mineral is present downhole, thereby leading to generation of carbon dioxide, at least one acid gas capturing agent that is reactive toward carbon dioxide may optionally be present. Suitable acid gas capturing agents that are reactive toward carbon dioxide may include various amines, such as aliphatic cyclic or acyclic amines. Amines may also be suitable for capturing hydrogen sulfide in some instances. Other suitable acid gas capturing agents that are reactive toward hydrogen sulfide may include compounds that react with the hydrogen sulfide by nucleophilic aromatic substitution. 4-Bromotoluene (p-bromotoluene) is a representative example of an aromatic compound that may react with hydrogen sulfide to promote sequestration thereof in the foregoing manner. 4-Bromotoluene may be advantageous in this respect since it is relatively inexpensive, widely available, and compatible with other components of the aqueous fluid compositions disclosed herein. Other halogenated aromatic compounds, such as fluorinated aromatic compounds and halogenated heteroaromatic compounds, may also be suitable for capturing hydrogen sulfide as well. By contacting hydrogen sulfide with a halogenated aromatic compound under alkaline conditions, the hydrogen sulfide may be at least partially deprotonated, thereby increasing its nucleophilicity for undergoing a reaction with the halogenated aromatic compound via nucleophilic aromatic substitution.

As used herein, the term "concentrated mineral acid" refers to an aqueous solution of a hydrogen halide, in which the hydrogen halide is at or near a saturation concentration in the aqueous solution. In non-limiting examples, the concentrated mineral acid used in the disclosure herein may comprise concentrated hydrochloric acid, concentrated hydrobromic acid, or concentrated hydroiodic acid. Concentrated hydroiodic acid may be particularly advantageous for the reasons discussed above. The concentrated hydroiodic acid may have a concentration of about 55% w/v to about 67% w/v, including about 57% w/v or about 67% w/v in particular examples.

In non-limiting examples, the first salt may comprise an alkali metal iodide. Alkali metal iodides suitable for use in the disclosure herein may include lithium iodide, sodium iodide, potassium iodide, rubidium iodide, cesium iodide, and any combination thereof. Sodium iodide and potassium iodide may be desirable due to their relatively low cost relative to other alkali metal iodides.

In non-limiting examples, the second salt may comprise a hypophosphite salt, preferably an alkali metal hypophosphite or a hydrate thereof. Suitable alkali metal hypophosphites may include, for example, lithium hypophosphite, sodium hypophosphite, potassium hypophosphite, rubidium hypophospite, cesium hypophosphite, or any combination thereof. Sodium hypophosphite monohydrate may be desirable due to the ready availability of this alkali metal hypophosphite. Hypophosphite salts may be particularly advantageous due to their ability to simultaneously promote formation of an aqueous-soluble barium salt and facilitate reduction of sulfate.

Iodide ions may be supplied in the aqueous fluid compositions of the present disclosure from the concentrated mineral acid (if concentrated hydroiodic acid is used), the first salt (iodide salt), or any combination thereof. If concentrated hydroiodic acid is used, the hydroiodic acid may supply a majority of the iodide ions on a molar basis. Optionally, the first salt may be omitted if the hydroiodic acid is capable of supplying sufficient iodide ions alone. Any ratio of hydroiodic acid to iodide salt may be used to supply the iodide ions and provided that sufficient acid is present to supply sufficient hydrogen ions for Reactions 2 and 3 to occur. In non-limiting examples, a molar ratio of hydroiodic acid to the second salt (e.g., a hypophosphite salt) in the aqueous fluid compositions may be about 5 or greater on a molar basis and/or a molar ratio of total iodide ions to the second salt (e.g., a hypophosphite salt) in the aqueous fluid compositions may be about 5 or greater. Total iodide ions in the aqueous fluid compositions may be determined from the number of moles of iodide ions in the chosen quantity of hydroiodic acid (if present) and the number of moles of iodide ions in the chosen quantity of the first salt. A molar ratio of 5 or greater for total iodide ions relative to the second salt is the minimum stoichiometric ratio needed to promote complete formation of the aqueous-soluble barium salt according to Reaction 1 and to promote complete conversion of sulfate anions into hydrogen sulfide according to Reactions 2 and 3. As discussed above, however, the actual reaction stoichiometry may differ from theoretical stoichiometric ratios due to phase equilibria of various iodine-containing species. To provide a margin of error, the molar ratio of total iodide ions relative to the second salt may optionally be about 6 or greater, or about 7 or greater, or about 8 or greater, or about 9 or greater, or about 10 or greater, such as about 6 to about 10, or about 6 to about 8, or about 7 to about 10, relative to the second salt (e.g., a hypophosphite salt). Molar ratios less than 5 may also be effective, although barite dissolution may be less complete in some cases. Any quantity of the first salt and the second salt may be present in the concentrated mineral acid up to the solubility limit therein.

The amount of water in the aqueous fluid compositions described herein may be limited as much as possible to decrease the likelihood of side reactions occurring with hydrogen sulfide to reform sulfate anions. In non-limiting examples, water from the concentrated mineral acid may be the sole source of water in the aqueous fluid compositions, other than trace moisture introduced from other sources. In other non-limiting examples, additional water may be added to the aqueous fluid compositions in an amount of about 10 vol. % or less, or about 8 vol. % or less, or about 6 vol. % or less, or about 4 vol. % or less, or about 2 vol. % or less.

The aqueous fluid compositions disclosed herein may comprise, consist of, or consist essentially of the concentrated mineral acid, the first salt comprising an iodide anion, and the second salt comprising an anion that forms an aqueous-soluble barium salt. For example, the aqueous fluid compositions may comprise, consist of, or consist essentially of concentrated hydroiodic acid, a first salt comprising an alkali metal iodide, and a second salt comprising an alkali metal iodide. It is to be appreciated that additional components may be present in the aqueous fluid compositions in response to particular conditions that may be present in a given location containing barite scale. Additional components that may optionally be present (either in dissolved form in the aqueous fluid compositions or suspended in the aqueous fluid composition) may include, but are not limited to, additional salts, additional acids (e.g., one or more organic acids), fluid loss control additives, gases, foaming agents, antifoaming agents, corrosion inhibitors, scale inhibitors, catalysts, biocides, friction reducing polymers, iron control agents, bridging agents, dispersants, hydrogen sulfide scavengers, carbon dioxide scavengers, oxygen scavengers, lubricants, viscosifiers, breakers, weighting agents, inert solids, emulsifiers, emulsion thinners, emulsion thickeners, surfactants, lost circulation additives, pH control additives, buffers, crosslinkers, stabilizers, chelating agents, mutual solvents, consolidating agents, complexing agents, particulate materials, and any combination thereof. Should additional components be present, they may be selected so as not to interfere with or undergo a reaction with the mineral acid, the first salt, or the second salt.

As mentioned above, one or more acid gases (e.g., hydrogen sulfide and carbon dioxide) may be produced in conjunction with removing barite scale with the aqueous fluid compositions described herein. Hydrogen sulfide production may occur when using the aqueous fluid compositions as a consequence of the reaction chemistry taking place to promote barite dissolution via sulfate reduction. Carbon dioxide production, in contrast, may occur if the barite contains an intermixed carbonate mineral (e.g., limestone/calcium carbonate, dolomite, iron carbonate, or other carbonate mineral) or a carbonate mineral is otherwise contacted with the aqueous fluid compositions in the course of promoting dissolution of barite scale.

Accordingly, the present disclosure further provides scale dissolution systems that may simultaneously or sequentially promote dissolution of barite scale and trapping of acid gases produced in conjunction with dissolution of the barite scale. The scale dissolution systems may comprise a first treatment phase comprising any of the aqueous fluid compositions discussed above, and a second treatment phase comprising a fluid composition comprising at least one acid gas capturing agent. In various embodiments, the at least one acid gas capturing agent in the second treatment phase may comprise at least a first component that is reactive toward hydrogen sulfide. If production of carbon dioxide is encountered or anticipated, the at least one acid gas capturing agent in the second treatment phase may further comprise a second component that is reactive toward carbon dioxide. That is, the second component that is reactive with carbon dioxide may be optional in some instances.

The fluid compositions defining the second treatment phase may be aqueous or non-aqueous in nature. Although aqueous or non-aqueous fluid compositions may be utilized in the second treatment phase, the second treatment phase may more desirably be non-aqueous in nature to limit the amount of water that is present, thereby lessening the likelihood of side reactions that may reform sulfate anions, as discussed above in more detail in reference to the first treatment phase. In non-limiting examples, the second treatment phase may comprise a water-miscible organic solvent such as, methanol, ethanol, ethylene glycol, propylene glycol, glyme, acetone, butanone, or the like. The water-miscible organic solvent may be present in an amount such that the at least one acid gas capturing agent remains dissolved once the second treatment phase has contacted the aqueous fluid composition associated with the first treatment phase. That is, the second treatment phase may promote liquid-liquid sequestration of the at least one acid gas.

Suitable acid gas capturing agents for sequestering carbon dioxide may include at least one amine, which may be cyclic or acyclic in nature. Suitable amines may include at least one primary amino group and/or at least one secondary amino group, each of which contain a replaceable hydrogen atom to promote formation of a reaction product with carbon dioxide. Specifically, a primary amino group or a secondary amino group may form a carbamate reaction product when carbon dioxide is contacted with the at least one amine. Suitable amines for capturing carbon dioxide may include, but are not limited to, pyrrolidine, piperazine, piperidine, morpholine, N-methylpiperazine, N-ethyl-piperazine, N-(2-hydroxyethyl)piperazine, N-(2-aminoethyl)piperazine, ethanolamine, diethanolamine, ethylaminoethanol, 1-amino-2-methylpropan-2-ol, 2-amino-1-butanol, 2-(2-aminoethoxy)ethanol, 2-(2-aminoethoxy)ethanamine, hexamethylenediamine (1,6-diaminohexane), pentamethylenediamine (1,5-diaminopentane), tetramethylenediamine (1,4-di aminobutane), 1,3-di aminopropane, 3-(methyl amino)propyl amine, N-(2-hydroxy ethyl)ethylenediamine, 3-(dimethyl-amino)propylamine, 3-(diethylamino)propylamine, N,N'-bis(2-hydroxyethyl)-ethylenediamine, and the like.

In more specific examples, the acid gas capturing agent that is reactive toward carbon dioxide may comprise piperazine. Piperazine may be advantageous in this respect due to its low cost, ready availability, and high thermal stability. Reaction 5 below shows the manner in which piperazine is believed to undergo a reaction with carbon dioxide to promote sequestration thereof.

Reaction 5

Amines may be used to sequester hydrogen sulfide as well, specifically through an acid-base reaction that protonates the amine and deprotonates the hydrogen sulfide. Thus, it is to be appreciated that amines may likewise be utilized to sequester hydrogen sulfide in the second phase treatment. More desirably, however, the second treatment phase may promote sequestration of hydrogen sulfide in a manner other than through an acid-base reaction. In particular, the second treatment phase used in the disclosure herein may contain at least one acid gas capturing agent that is reactive toward hydrogen sulfide through nucleophilic aromatic substitution. Suitable acid gas capturing agents that are reactive with hydrogen sulfide through nucleophilic aromatic substitution under suitable conditions may include various halobenzenes such as, for example, 4-bromotoluene, 4-fluorotoluene, 4-fluoronitrobenzene, and the like. Halogenated heteroaromatic compounds such as 2-fluoropyridine and 2-chloro-1,3,5-triazine may also be used similarly. Although fluorinated aromatic compounds tend to be more reactive toward nucleophilic aromatic substitution, 4-bromotoluene and similar bromobenzene and chlorobenzene compounds may be advantageous due to their lower cost and still-acceptable reactivity toward hydrogen sulfide. Without being bound by theory or mechanism, hydrogen sulfide is believed to undergo deprotonation to a hydrogen sulfide anion in the presence of an alkali metal base in the second treatment phase. The hydrogen sulfide anion is a nucleophile that may then displace the halogen atom from the halobenzene to form the corresponding thiol-substituted benzene. The thiol-substituted benzene may, in turn, undergo deprotonation in the presence of the alkali metal base, and the deprotonated thiol group may react as a nucleophile with a second equivalent of the halobenzene to form the corresponding thioether. Reaction 6 below shows the net reaction occurring when sequestering hydrogen sulfide with p-bromotoluene in the presence of an alkali metal base.

Reaction 6

In view of the foregoing, the present disclosure also provides methods for treating a location containing barite scale to promote dissolution of at least a portion of the barite scale therefrom. More specifically, such methods may comprise introducing an aqueous fluid composition described herein to a location containing barite scale, and contacting the barite scale with the aqueous fluid composition for a sufficient time to dissolve at least a portion of the barite scale.

It is to be appreciated that the rate of dissolution of barite scale may depend at least in part upon the temperature of the location where the barite scale is present. In non-limiting examples, the temperature of the location may range from room temperature (23° C.) up to about 200° C., or from about 50° C. to about 180° C., or about from about 80° C. to about 150° C., or about 95° C. to about 135° C., or about 100° C. to about 125° C. Suitable times for contacting the barite scale with the aqueous fluid compositions (soak times) may range from about 30 minutes to about 1 hour, or about 1 hour to about 12 hours, or about 2 hours to about hours, or about 4 hours to about 8 hours. The chosen time for contacting the aqueous fluid compositions with the barite scale may be selected to achieve a saturation or non-saturation concentration of the aqueous-soluble barium salt in the aqueous fluid compositions once at least partial dissolution of the barite scale has taken place.

Contacting of the barite scale with the aqueous fluid composition may occur under static or non-static (flowing) conditions. When non-static contacting is performed, the aqueous fluid compositions may be recirculated to the barite scale, if desired, provided that the aqueous fluid compositions still retain capacity for promoting additional dissolution of the barite scale.

Methods of the present disclosure may further comprise performing a second phase treatment at the location containing barite scale to capture at least a portion of at least one acid gas present therein. More specifically, methods of the present disclosure may further comprise introducing a fluid composition comprising at least one acid gas capturing agent to the location, and reacting the at least one acid gas capturing agent with at least a portion of at least one acid gas that is present at the location. The acid gas being captured at the location may comprise at least hydrogen sulfide, optionally in further combination with carbon dioxide. Hydrogen sulfide being captured at the location may originate from reduction of sulfate with iodide in the aqueous fluid compositions. Optionally, additional hydrogen sulfide at the location may originate from a source other than the barite undergoing dissolution with the aqueous fluid compositions.

The second phase treatment containing the at least one acid gas capturing agent may be introduced to the location containing barite scale separately from the aqueous fluid composition that promotes dissolution of at least a portion of the barite scale (optionally, after dissolution of the barite scale is substantially complete), or the second phase treatment may be combined with the aqueous fluid composition at some time before dissolution of the barite scale is complete. In non-limiting examples, the second phase treatment may be introduced to the location containing barite scale and combined with the aqueous fluid composition about 1 hour after the aqueous fluid composition has begun contacting the barite scale, or about 2 hours after, or about 3 hours after, or about 4 hours after, or about 5 hours after, or about 6 hours after. The chosen time for introducing the second phase treatment may be selected in response to how much barite scale dissolution and acid gas generation have taken place. For example, acid gas levels during the initial stages of barite dissolution may remain at non-problematic levels until a greater extent of barite dissolution has taken place or until production of spent aqueous fluid compositions needs to take place.

In still another instance, the first treatment phase and the second treatment phase may be combined together with one another before contacting the barite scale. Such combination fluids may comprise a concentrated mineral acid (e.g., hydroiodic acid), a first salt comprising an iodide anion (e.g., an alkali metal iodide), a second salt comprising an anion that forms an aqueous-soluble barium salt (e.g., a hypophosphite salt), and at least one acid gas capturing agent (e.g., a halobenzene, an amine, or any combination thereof).

The location containing the barite scale is not believed to be particularly limited and may include any of a subterranean formation, a wellbore penetrating a subterranean formation, a downhole tool within a wellbore penetrating a subterranean formation, a plant, a pipeline, or any combination thereof.

It also is to be appreciated that barite scale dissolution in the disclosure herein may take place with the aqueous fluid compositions in the presence of formation water, crude oil, or any combination thereof. The concentration of active components in the aqueous fluid compositions may be increased, if necessary, to promote effective dissolution of barite scale in the presence of formation water and/or crude oil.

Embodiments disclosed herein include:

A. Aqueous fluid compositions effective for solubilizing barite scale. The compositions comprise: a concentrated mineral acid; a first salt comprising an iodide anion; and a second salt comprising an anion that forms an aqueous-soluble barium salt.

B. Scale dissolution systems. The systems comprise: a first treatment phase comprising an aqueous fluid composition, the aqueous fluid composition comprising: a concentrated mineral acid; a first salt comprising an iodide anion; and a second salt comprising an anion that forms an aqueous-soluble barium salt; and a second treatment phase comprising a fluid composition comprising at least one acid gas capturing agent.

C. Methods for removing barite scale. The methods comprise: introducing an aqueous fluid composition to a location containing barite scale, the aqueous fluid composition comprising: a concentrated mineral acid; a first salt comprising an iodide anion; and a second salt comprising an anion that forms an aqueous-soluble barium salt; and contacting the barite scale with the aqueous fluid composition for a sufficient time to dissolve at least a portion of the barite scale.

Each of embodiments A, B, and C may have one or more of the following additional elements in any combination:

Element 1: wherein the concentrated mineral acid comprises hydroiodic acid.

Element 2: wherein the second salt is a reducing agent.

Element 3: wherein the second salt comprises a hypophosphite salt.

Element 4: wherein a molar ratio of hydroiodic acid to hypophosphite salt in the aqueous fluid composition is about 5 or greater and/or a molar ratio of total iodide ions to hypophosphite salt in the aqueous fluid composition is about 5 or greater.

Element 5: wherein the first salt comprises an alkali metal iodide.

Element 6: wherein the second salt comprises an alkali metal hypophosphite.

Element 7: wherein the first salt comprises an alkali metal iodide and the second salt comprises an alkali metal hypophosphite.

Element 7A: wherein the first salt comprises an alkali metal iodide, the second salt comprises an alkali metal hypophosphite, and the concentrated mineral acid comprises hydroiodic acid.

Element 7B: wherein the concentrated mineral acid comprises hydroiodic acid and the second salt comprises a hypophosphite salt.

Element 7C: wherein the concentrated mineral acid comprises hydroiodic acid, and the first salt comprises an alkali metal iodide.

Element 8: wherein the at least one acid gas capturing agent in the second treatment phase comprises at least a first component reactive toward hydrogen sulfide.

Element 9: wherein the at least one acid gas capturing agent in the second treatment phase further comprises a second component reactive toward carbon dioxide.

Element 10: wherein the second component comprises at least one amine.

Element 11: wherein the first component is reactive toward hydrogen sulfide through nucleophilic aromatic substitution.

Element 12: wherein the first component comprises p-bromotoluene.

Element 13: wherein the method further comprises: introducing a fluid composition comprising at least one acid gas capturing agent to the location; and reacting the at least one acid gas capturing agent with at least a portion of at least one acid gas that is present at the location.

Element 14: wherein the at least one acid gas comprises hydrogen sulfide, carbon dioxide, or any combination thereof.

Element 15: wherein the at least one acid gas comprises at least hydrogen sulfide, and at least a portion of the hydrogen sulfide is formed upon contacting the barite scale with the aqueous fluid composition.

Element 16: wherein the at least one acid gas capturing agent in the fluid composition comprises a first component reactive toward hydrogen sulfide and optionally, a second component reactive toward carbon dioxide.

Element 17: wherein the location is a subterranean formation, a wellbore penetrating a subterranean formation, a pipeline, or any combination thereof.

By way of non-limiting exemplary combinations applicable to A, B, and C include, but are not limited to: 1 and 2; 1 and 3; 1 and 4; 1 and 5; 1 and 6; 1, and 7, 7A, 7B, or 7C; 2 or 3, and 4; 2 or 3, and 5; 2 or 3, and 6; 2 or 3, and 7, 7A, 7B, or 7C; 4 and 5; 4 and 6; and 4, and 7, 7A, 7B, or 7C. Additional non-limiting exemplary combinations applicable to B include, but are not limited to: 1, 3, 4, 5, 6, 7, 7A, 7B, or 7C, and 8; 1, 3, 4, 5, 6, 7, 7A, 7B, or 7C, and 8 and 9; 1, 3, 4, 5, 6, 7, 7A, 7B, or 7C, and 8-10; 1, 3, 4, 5, 6, 7, 7A, 7B, or 7C, and 8 and 11; 1, 3, 4, 5, 6, 7, 7A, 7B, or 7C, and 8, 11, and 12; 1, 3, 4, 5, 6, 7, 7A, 7B, or 7C, and 8 and 12; 8 and 9; 8-10; 8, 9, and 11; 8 and 11; 8, 11, and 12; and 8 and 12. Additional non-limiting exemplary combinations applicable to C include, but are not limited to 1, 3, 4, 5, 6, 7, 7A, 7B, or 7C, and 13; 1, 3, 4, 5, 6, 7, 7A, 7B, or 7C, and 13 and 14; 1, 3, 4, 5, 6, 7, 7A, 7B, or 7C, and 13 and 15; 1, 3, 4, 5, 6, 7, 7A, 7B, or 7C, and 13 and 16; 1, 3, 4, 5, 6, 7, 7A, 7B, or 7C, and 13 and 17; 1, 3, 4, 5, 6, 7, 7A, 7B, or 7C, and 17; 13 and 14; 13 and 15; 13 and 16; 13 and 17; 10, 13, and 16; 11, 13, and 16; and 10, 11, 13, and 16.

To facilitate a better understanding of the embodiments described herein, the following examples of various representative embodiments are given. In no way should the following examples be read to limit, or to define, the scope of the present disclosure.

EXAMPLES

Materials and Reagents. All glassware used in chemical preparations was washed with 10% (v/v) HCl and triple rinsed with sterilized 18 MΩ water before use. Industrial or synthetic grade barite ($BaSO_4$-98.5%) scale crystal was purchased from Chemi-Enterprise, India. Typical reservoir or rear barite scale from downhole was obtained from representative Saudi Aramco wells. The downhole barite scale contained 96.2% barite by weight and 3.8% quartz, $CaCO_3$, and $FeCO_3$ by weight. Reagent grade hydroiodic acid (HI, 67% by weight), potassium iodide (KI, 99%), sodium hypophosphite monohydrate ($NaH_2PO_2H_2O$, ≥99%), sodium hydroxide (NaOH, 99%), and isopropyl alcohol were all acquired from Sigma-Aldrich. 4-Bromotoluene ($C_7H_7Br$, 98%) and piperazine ($C_4H_{10}N_2$, 97%) were purchased from Fischer scientific.

First Phase Treatment: Preparation of Representative Aqueous Fluid Composition for Removing Barite Scale. Potassium iodide (KI, 46 g, 0.28 mol) was placed in a 1 L two-neck round-bottom flask equipped with a reflux condenser, magnetic stirrer, glass thermometer, and an inlet funnel. Hydroiodic acid (HI, 67% w/v, density=1.95-2.02 g/cm 3, 400 mL, approximately 4.13 mol iodide) was then added. The flask was placed on a heating mantle, and the mixture was allowed to undergo reflux distillation to remove non-condensable and volatile iodine-containing species, respectively, at a temperature of 128° C. while stirring continuously with a magnetic stir bar. Sodium hypophosphite monohydrate ($NaH_2PO_2H_2O$, 82 g, 0.77 mol) was then added to the reaction mixture. A stream of $N_2$ gas was continuously bubbled into the reaction mixture to preclude oxygen ingress. During 3 hours of reflux distillation in the presence of the sodium hypophosphite monohydrate, the reaction mixture changed from an initial deep yellowish color to a colorless state (believed to result from reduction of $I_2$ or $I_3^-$ into $I^-$). The reaction mixture was then cooled over 1 hour under a stream of $N_2$ gas and used directly in the further experiments below. Other aqueous fluid compositions containing different amounts of the foregoing components were prepared similarly.

Second Phase Treatment: Preparation of Representative Fluid Composition for Capturing Acid Gases in Conjunction with Removing Barite Scale. An equimolar mixture of p-bromotoluene and piperazine was stirred in 350 mL isopropyl alcohol at room temperature for 1 hour in a 1 L flask. A white solution was obtained. After the initial 1 hour stirring period, 10% sodium hydroxide solution was added to the white solution to form a colorless solution, which was then used directly in the further experiments below.

Figure 1:
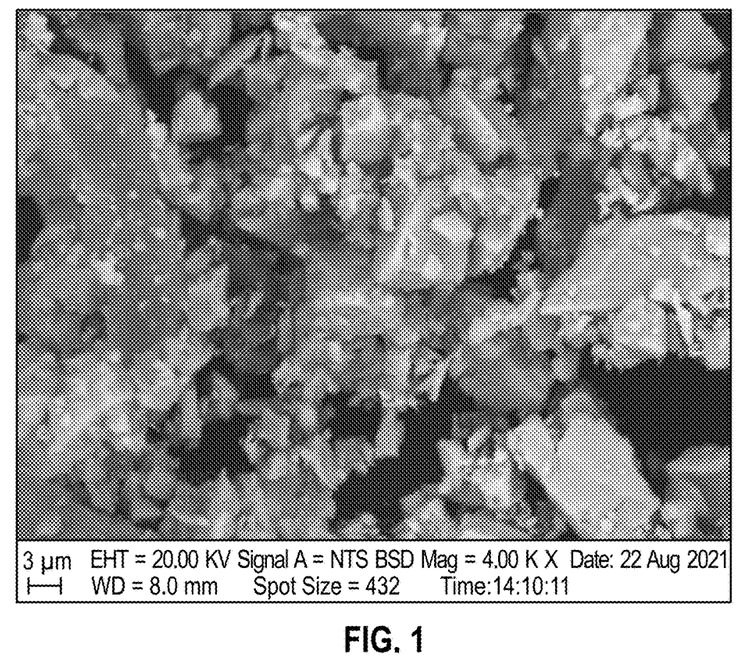
FIG. 1 is an SEM image of synthetic industrial grade barite.
Figure 2:
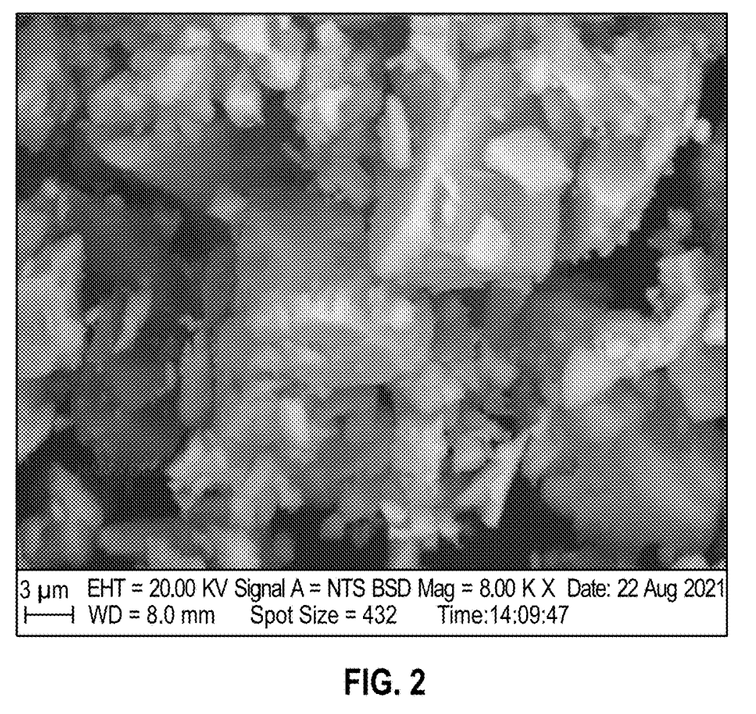
FIG. 2 is an SEM image of downhole barite scale.

Barite Dissolution Conditions. Barite dissolution tests were carried out using double-jacketed glassware and a hot plate set up to maintain static temperature conditions. Barite dissolution was conducted at temperatures of 100° C. and 130° C. (representative of shallow and deep hydrocarbon wells, respectively) over soaking periods of 0 h, 2 h, 4 h, 6 h, 8 h, and 10 h. Both synthetic industrial grade barite (SEM image shown in FIG. 1) and downhole barite scale (SEM image shown in FIG. 2) were tested. Prior to the start of each experiment, the barite surface was cleaved with a razor blade and polished. Additional dissolution experiments were run in the presence of 15% formation water or 15% crude oil to determine the effect of these components on barite dissolution. Barite dissolution under each set of conditions was determined gravimetrically.

Figure 3:
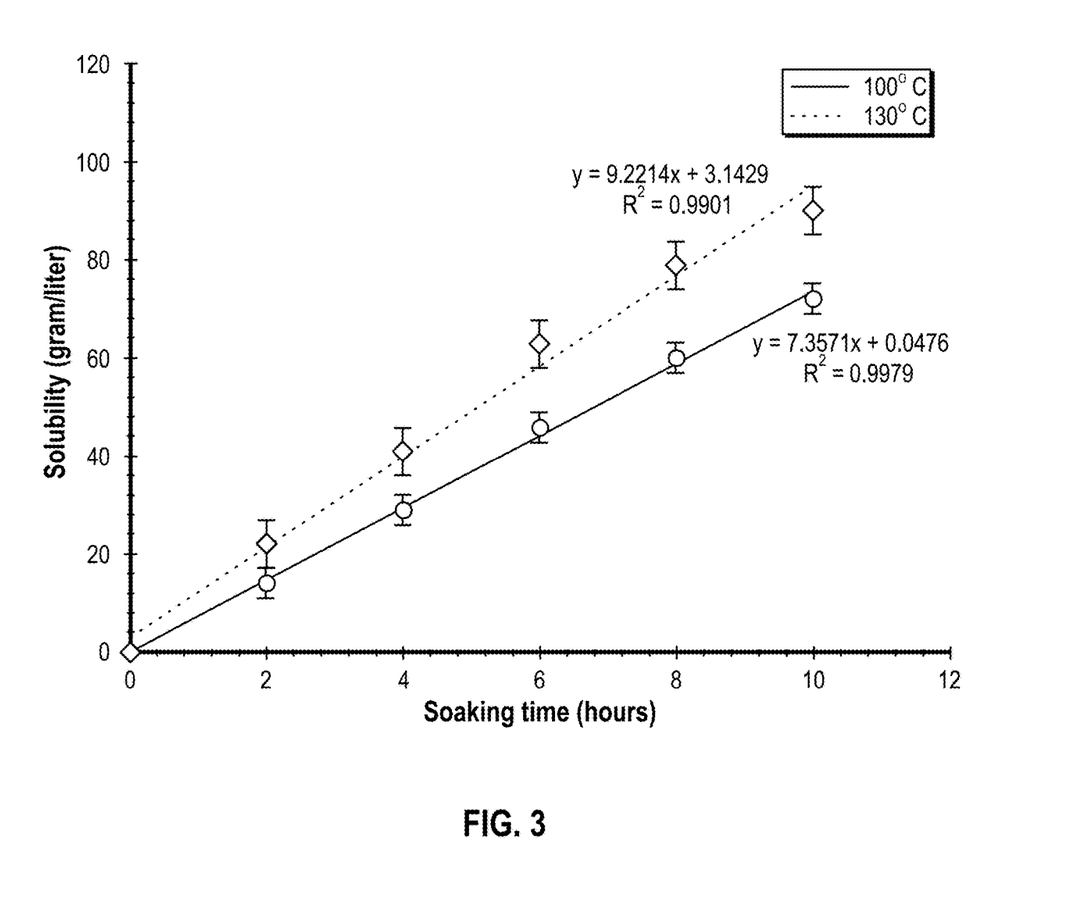
FIG. 3 is a graph of barite solubility as a function of soaking time under various conditions.
Figure 4:
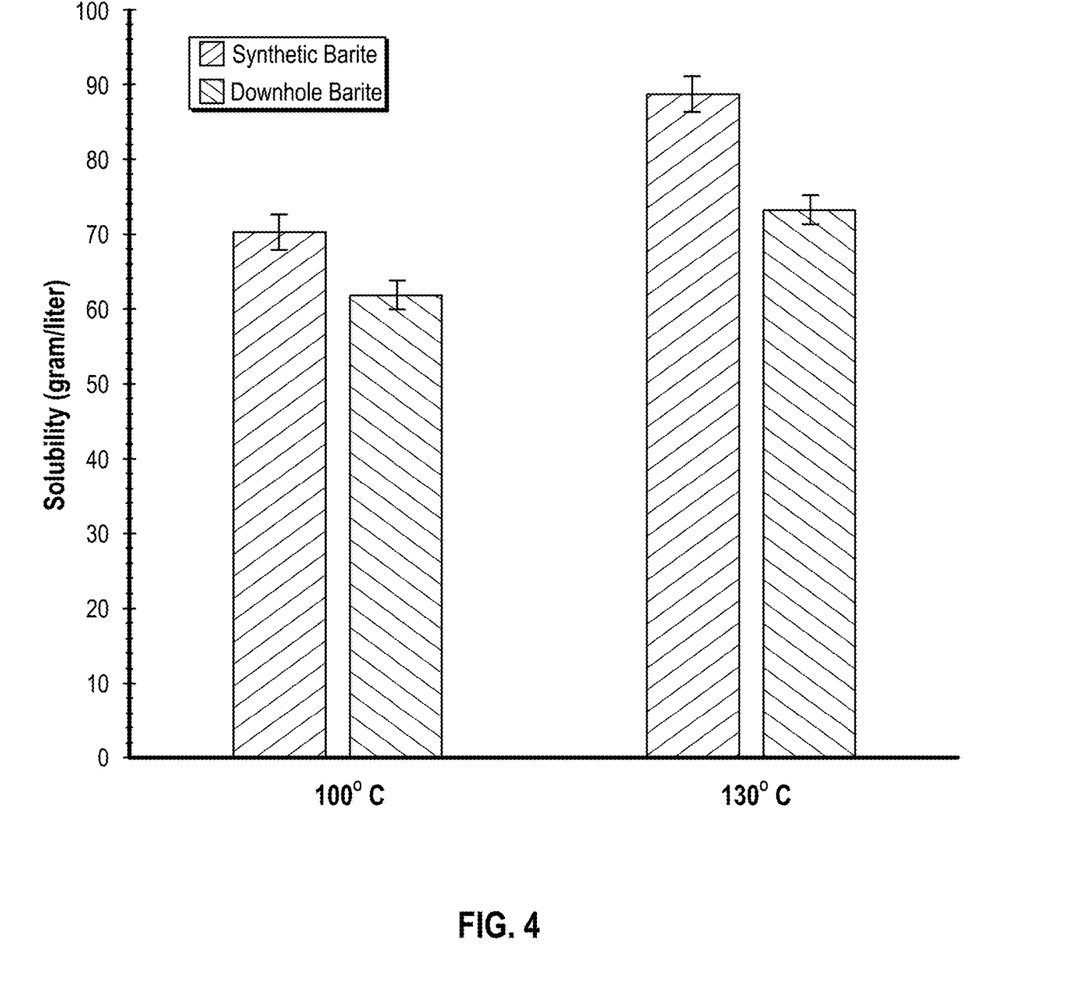
FIG. 4 is a graph of comparing solubility of synthetic industrial grade barite against that of downhole barite scale at a soaking time of 8 hours at 100° C. and 130° C.

FIG. 3 is a graph of barite solubility as a function of soaking time under various conditions. The data presented in FIG. 3 is for synthetic industrial grade barite without formation water or crude oil hydrocarbons being present. As shown, the amount of dissolved barite increased with time, and the dissolution also increased with temperature. The maximum solubility was 90.5 g/L at 130° C. and 72.0 g/L at 100° C. FIG. 4 is a graph comparing solubility of synthetic industrial grade barite against that of downhole barite scale at a soaking time of 8 hours at 100° C. and 130° C. As shown, the downhole barite scale resulted in a lower barite solubility than did the synthetic industrial grade barite at both 100° C. and 130° C. The maximum barite solubility for both samples was 10-12% higher at 130° C. relative to the solubility at 100° C.

Figure 5:
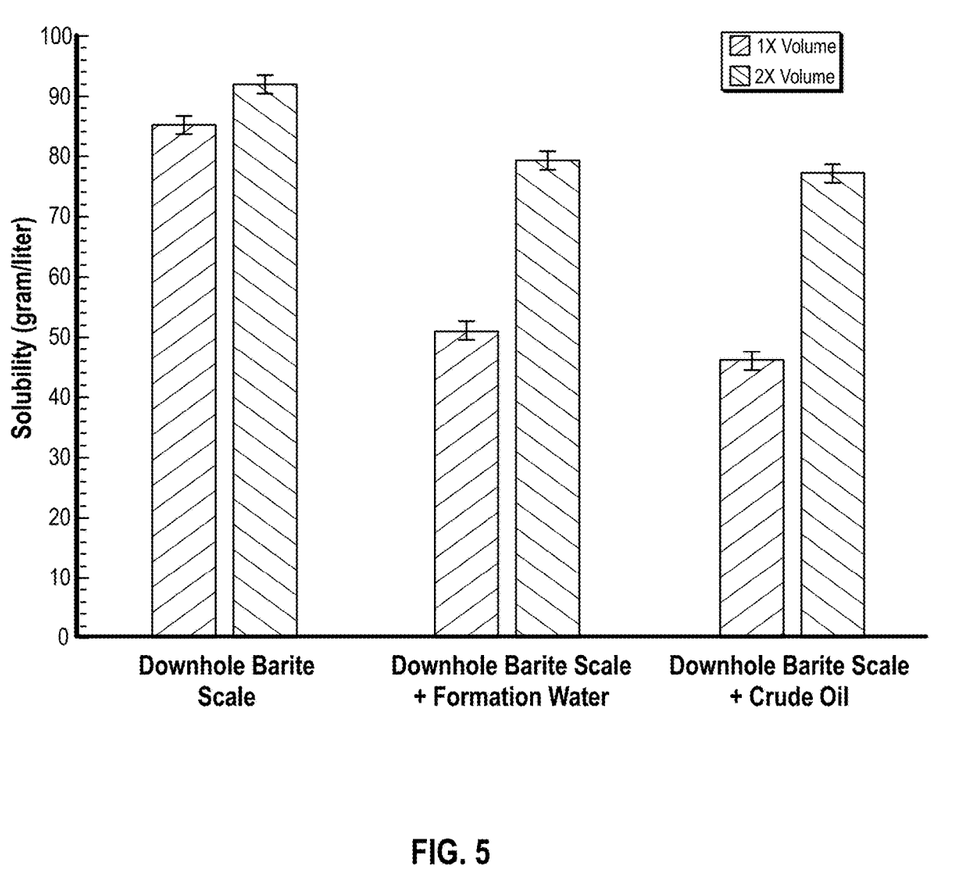
FIG. 5 is a graph comparing the solubility of downhole barite scale alone at 130° C. against the solubility measured under similar conditions in the presence of formation water or crude oil.

FIG. 5 is a graph comparing the solubility of downhole barite scale alone at 130° C. against the solubility measured under similar conditions in the presence of formation water or crude oil. The soaking time was 10 hours, and the barite scale was present at 70% w/v with respect to the formation water or crude oil. The aqueous fluid composition was tested at the concentration prepared above at a set volume (1× volume) and at double the set volume (2× volume). As shown, both formation water and crude oil decreased the barite solubility, but the solubility decrease was considerably less pronounced when the aqueous fluid composition volume was doubled (2× volume).

Figure 6:
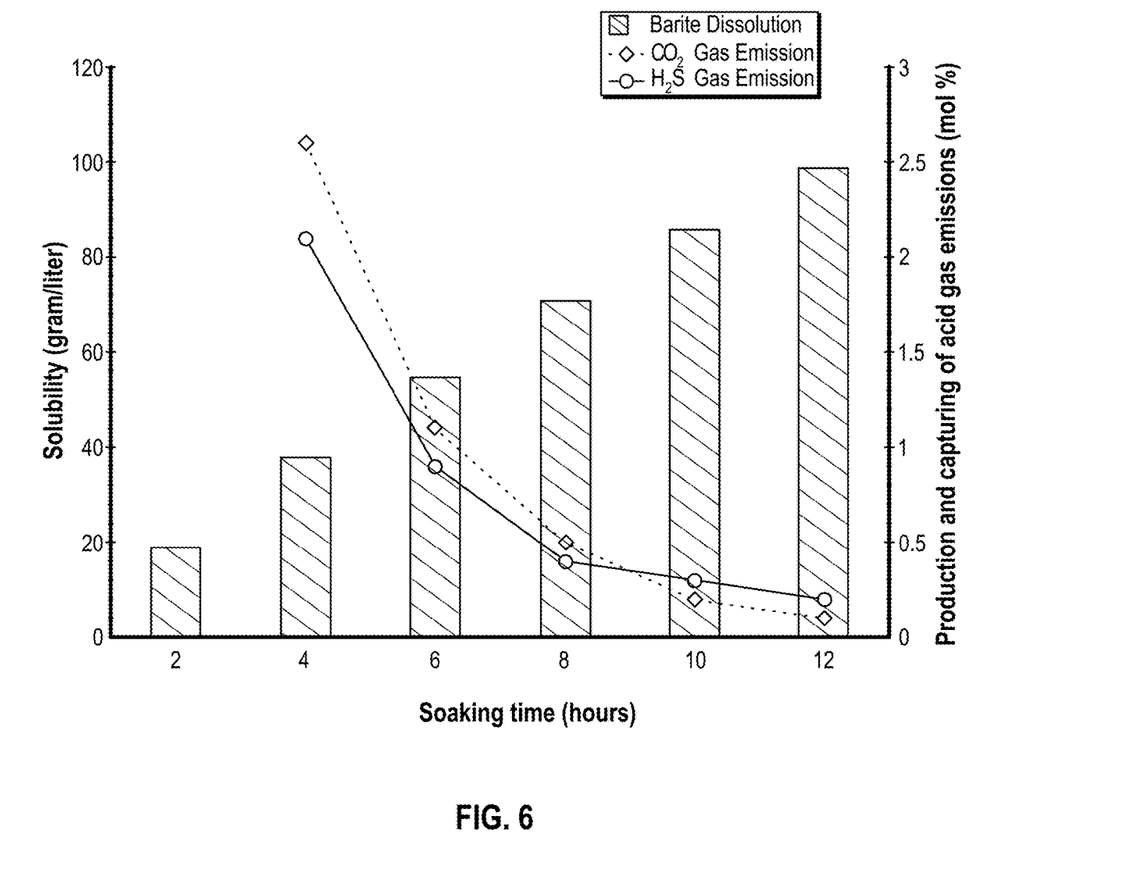
FIG. 6 is a graph showing the progression of barite scale dissolution and the subsequent production and capturing of acid gases at 130° C.

Acid Gas Release. When downhole barite scale was dissolved with the aqueous fluid compositions disclosed above, about 5% $H_2S$ and about 3% $CO_2$ by mass relative to the barite were released. The acid gases were captured using the second phase treatment specified above. In brief, acid gas capturing was conducted after 4-6 hours of contact time at 130° C. between the barite scale and the first phase aqueous fluid composition specified above. During the barite dissolution process, $H_2S$ and $CO_2$ concentrations were monitored in situ with an electrochemical analyzer, and as soon as both concentrations neared 2.5 mol %, acid gas capturing was performed, as illustrated in FIG. 6. Upon reaching the foregoing threshold concentrations for both acid gases after approximately 4 hours of soaking, the second phase treatment (67 mL) was added dropwise via a peristaltic pump through coiled tubing to the reaction mixture (1 L of the first phase treatment). The second phase treatment was effective for substantially preventing the release of the acid gases, as shown by the subsequent decrease in acid gas concentrations over time. In a wellbore, the second phase treatment may be obtained during flow-back to recover the acid gases sequestered therein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. An aqueous fluid composition comprising:
   a concentrated mineral acid comprising concentrated hydroiodic acid;
   a first salt comprising an iodide anion; and
   a second salt comprising an anion that forms an aqueous-soluble barium salt;
   wherein a molar ratio of total iodide ions to second salt in the aqueous fluid composition is about 5 to about 10; and
   wherein water from the concentrated mineral acid is the sole source of water in the aqueous fluid composition, other than trace moisture, or up to about 10 vol. % additional water from a source other than the concentrated mineral acid is present in the aqueous fluid composition.

2. The aqueous fluid composition of claim 1, wherein the second salt is a reducing agent.

3. The aqueous fluid composition of claim 1, wherein the second salt comprises a hypophosphite salt.

4. The aqueous fluid composition of claim 3, wherein a molar ratio of hydroiodic acid to hypophosphite salt in the aqueous fluid composition is about 5 to about 10.

5. The aqueous fluid composition of claim 1, wherein the first salt comprises an alkali metal iodide.

6. The aqueous fluid composition of claim 5, wherein the second salt comprises an alkali metal hypophosphite.

7. The aqueous fluid composition of claim 6, wherein a molar ratio of hydroiodic acid to alkali metal hypophosphite in the aqueous fluid composition is about 5 to about 10.

8. A scale dissolution system comprising:
   a first treatment phase comprising the aqueous fluid composition of claim 1; and
   a second treatment phase comprising a fluid composition comprising at least one acid gas capturing agent.

9. The scale dissolution system of claim 8, wherein the second salt comprises a hypophosphite salt.

10. The scale dissolution system of claim 9, wherein a molar ratio of hydroiodic acid to hypophosphite salt in the first treatment phase is about 5 to about 10.

11. The scale dissolution system of claim 8, wherein the first salt comprises an alkali metal iodide and the second salt comprises an alkali metal hypophosphite.

12. The scale dissolution system of claim 8, wherein the at least one acid gas capturing agent in the second treatment phase comprises at least a first component reactive toward hydrogen sulfide.

13. The scale dissolution system of claim 12, wherein the at least one acid gas capturing agent in the second treatment phase further comprises a second component reactive toward carbon dioxide.

14. The scale dissolution system of claim 13, wherein the second component comprises at least one amine.

15. The scale dissolution system of claim 12, wherein the first component is reactive toward hydrogen sulfide through nucleophilic aromatic substitution.

16. The scale dissolution system of claim 15, wherein the first component comprises p-bromotoluene.

17. A method comprising:
introducing the aqueous fluid composition of claim 1 to a location containing barite scale; and
contacting the barite scale with the aqueous fluid composition for a sufficient time to dissolve at least a portion of the barite scale.

18. The method of claim 17, wherein the second salt comprises a hypophosphite salt.

19. The method of claim 18, further comprising:
introducing a fluid composition comprising at least one acid gas capturing agent to the location; and
reacting the at least one acid gas capturing agent with at least a portion of at least one acid gas that is present at the location.

20. The method of claim 19, wherein the at least one acid gas comprises hydrogen sulfide, carbon dioxide, or any combination thereof.

21. The method of claim 20, wherein the at least one acid gas comprises at least hydrogen sulfide, and at least a portion of the hydrogen sulfide is formed upon contacting the barite scale with the aqueous fluid composition.

22. The method of claim 19, wherein the at least one acid gas capturing agent in the fluid composition comprises a first component reactive toward hydrogen sulfide and optionally, a second component reactive toward carbon dioxide.

23. The method of claim 17, wherein the location is a subterranean formation, a wellbore penetrating a subterranean formation, a pipeline, or any combination thereof.

* * * * *